US005276692A

United States Patent [19]

Kwon

[11] Patent Number: 5,276,692

[45] Date of Patent: Jan. 4, 1994

[54] SELF-TESTING AND MUTUAL TESTING OF MULTIFUNCTIONAL REMOTE CONTROL TRANSMITTERS

[75] Inventor: Sun-don Kwon, Seoul, Rep. of Korea

[73] Assignee: SamSung Electronics Co., Ltd., Kyungki, Rep. of Korea

[21] Appl. No.: 755,324

[22] Filed: Sep. 5, 1991

[30] Foreign Application Priority Data

Oct. 26, 1990 [KR] Rep. of Korea .................... 90-17221

[51] Int. Cl.[5] .............................................. G06F 11/00

[52] U.S. Cl. ................................ 371/5.1; 340/825.57; 340/825.72; 340/825.69; 358/194.1; 371/20.1; 371/25.1; 371/17; 371/67.1

[58] Field of Search ...................... 371/5.1, 29.1, 67.1, 371/20.1, 20.5, 25.1, 17; 340/825.69, 825.72; 358/194.1, 10, 139; 359/143, 145; 455/151.4

[56] References Cited

U.S. PATENT DOCUMENTS

| | | | |
|---|---|---|---|
| 3,934,188 | 1/1976 | York | 320/48 |
| 4,499,581 | 2/1985 | Miazga et al. | 371/20 |
| 4,566,034 | 1/1986 | Harger et al. | 358/194.1 |
| 4,623,887 | 11/1986 | Welles | 340/825.51 |
| 4,626,448 | 12/1986 | Ehlers | 455/608 |
| 4,773,070 | 9/1988 | Schumm et al. | 371/20.5 |
| 4,825,200 | 4/1989 | Evans et al. | 341/23 |
| 4,856,081 | 8/1989 | Smith | 359/145 |
| 5,028,919 | 7/1991 | Hidaka | 358/194.1 |
| 5,146,210 | 9/1992 | Heberle | 358/194.1 |
| 5,148,159 | 9/1992 | Clark et al. | 340/825.22 |

FOREIGN PATENT DOCUMENTS

| | | |
|---|---|---|
| 3140415C2 | 6/1986 | Fed. Rep. of Germany . |
| 60-220447 | 7/1986 | Japan . |

*Primary Examiner*—Robert W. Beausoliel, Jr.
*Assistant Examiner*—Phung My Chung
*Attorney, Agent, or Firm*—Robert E. Bushnell

[57] ABSTRACT

A self-testing and mutual testing method of multifunctional remote control transmitters includes the steps of self-testing multifunctional remote control transmitters by selecting a self-testing mode using a test pin switch, mutually testing multifunctional remote control transmitters by selecting a mutual testing mode, compressing and analyzing data by the multifunctional remote control transmitters, and displaying the error condition. The method facilitates checking faults occurring in multifunctional remote control transmitters, thereby reducing poor products and enhancing the reliability of the products.

19 Claims, 5 Drawing Sheets

SELF-TESTING AND MUTUAL TESTING OF MULTIFUNCTIONAL REMOTE CONTROL TRANSMITTERS

BACKGROUND OF THE INVENTION

The present invention relates to a method for self-testing and mutual testing of multifunctional remote control transmitters used to control household appliances such as stereos and televisions; and particularly to a method for improving reliability of the transmitting and receiving conditions of the multifunctional remote control transmitter having an infrared receiver therein by self-testing and mutual testing.

An ordinary multifunctional remote control transmitter disclosed in U.S. Pat. No. 4,623,887 is illustrated in FIG. 1. Referring to FIG. 1, to learn, store and retransmit a remote control code transmitted from any other similar remote control transmitter, the multifunctional remote control transmitter comprises microprocessor 1, infrared receiver 2, signal converter 3, infrared transmitter 4, expanded memory 5, key selector 6, display 7 and battery check unit 8. The microprocessor 1 controls the entire system of the multifunctional remote control transmitter. The infrared receiver 2 detects and amplifies a signal transmitted from any other remote control transmitter. The signal converter 3 converts a signal received by the infrared ray receiver 2 into a signal that the microprocessor 1 can analyze. The infrared transmitter 4 converts an electric signal transmitted from the microprocessor 1 to a light signal and then transmits it. The expanded memory 5 stores code information entered from the infrared receiver 2 and the key selector 6 inputs a key selection signal to the microprocessor 1. The display 7 is a liquid crystal device (LCD) to display received data from the microprocessor 1. The battery check unit 8 transmits a battery detecting signal to the microprocessor 1. The reference number 9 in FIG. 1 represents a light emitting diode (LED) and number 10 represents a memory back-up circuit for maintaining the memory state of the expanded memory 5 during absence of power.

The ordinary multifunctional remote control transmitter, however, has drawbacks that make it difficult to detect circuit malfunction caused by poor soldering and misalignment; and to test the remote control transmitter itself or any other remote control transmitter.

SUMMARY OF THE INVENTION

Therefore, it is an object of the invention to provide a method for self-testing and mutual testing of multifunctional remote control transmitters which facilitate the cure defect occurring in production of multifunctional remote control transmitter by automatically detecting a malfunction by means of a display incorporated therein, and allow the mutual testing between one multifunctional remote control transmitter and any other transmitter to find fault, thereby reducing defective products.

To achieve the object, the method for self-testing and mutual testing of multifunctional remote control transmitters of the present invention comprises the steps of:

determining whether or not the current mode is a self-testing mode, then, if the current mode is not a self-testing mode, performing a usual learning program, and when the mode is a self-testing mode, examining the condition of components of the multifunctional remote control transmitter to display the condition, and then, enabling and initializing the state of a waveform receiving mode;

determining whether or not the current mode is a mutual testing mode, then, if the current mode is not a mutual testing mode, performing a usual learning program and when the mode is a mutual testing mode, determining whether or not the current mode is of a waveform receiving mode;

converting the current mode to a waveform transmitting mode when the current mode is not a waveform receiving mode, then, outputting data stored in a microprocessor in accordance with a key signal, and then, increasing a key selection value by a certain value in order to output compressed data corresponding to the next key selection value, simultaneously converting the current mode to a waveform receiving mode;

comparing data of an expanded memory and the microprocessor to each other if converted to the waveform receiving mode in the former step, then, displaying a receiving error count value when the comparison of data is completed;

inspecting whether or not data is all stored in the expanded memory if the current mode is of a waveform receiving mode in the aforementioned step that determines whether or not the current mode is the waveform receiving mode, then if the data is all stored, analyzing and compressing the data while a flag of the expanded memory is set;

comparing the data compressed in the data analysis and compression step to the compressed data stored in the microprocessor, then, if the data do not match each other, increasing an error count value, if the data match each other, increasing key selection value to be compared and simultaneously converting the waveform receiving mode to the waveform transmitting mode;

inspecting whether or not data is all transmitted for each key selection value, then if the data is all transmitted, displaying a transmitting error count value, if the data is not all transmitted, waiting for a while and returning to the step that determines whether or not the current mode is mutual testing mode.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 1:
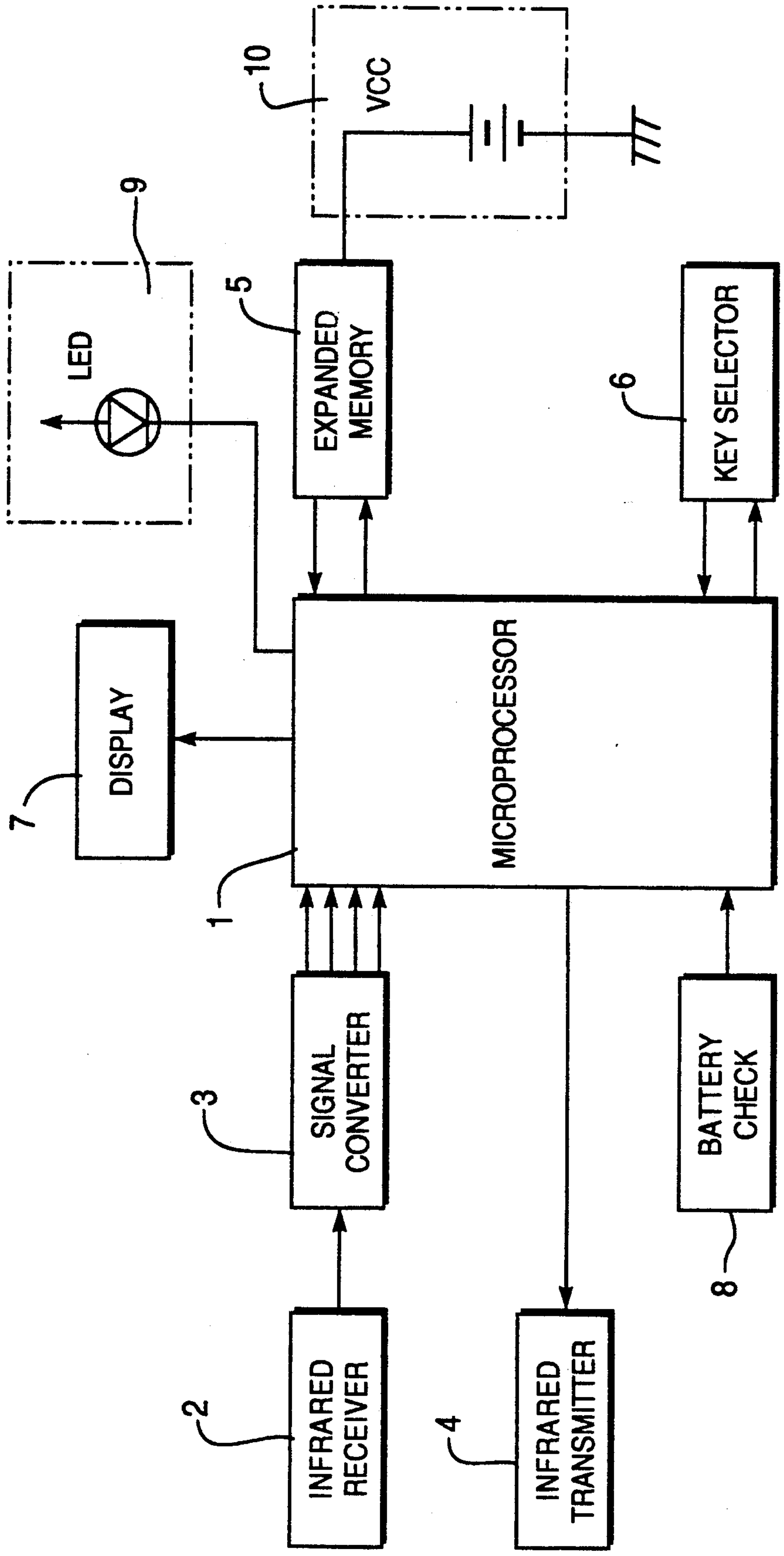
FIG. 1 PRIOR ART
FIG. 1 is a block diagram of a conventional multifunctional remote control transmitter.
Figure 2:
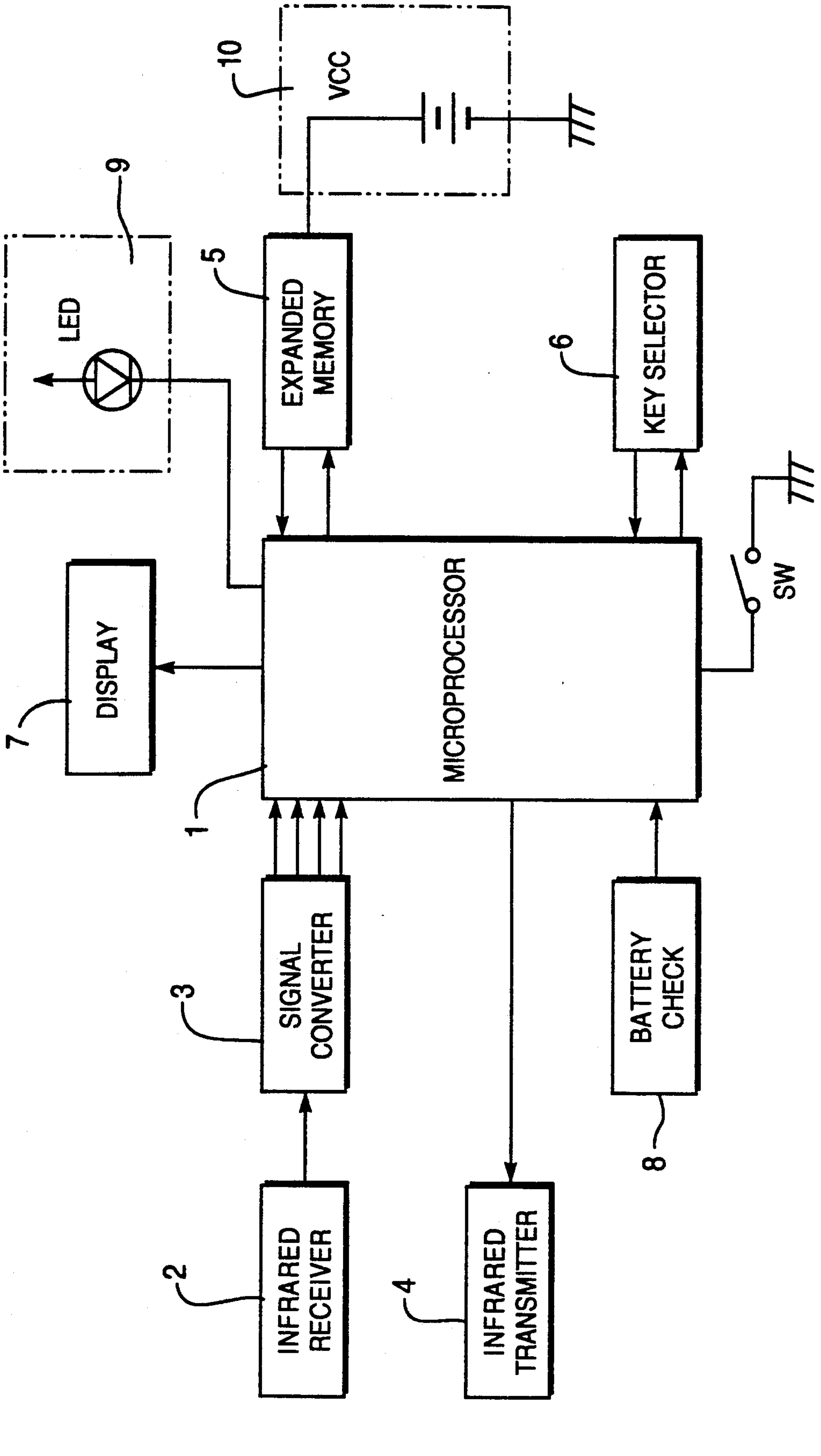
FIG. 2 is a block diagram of a multifunctional remote control transmitter of the present invention.

FIG. 2 illustrates the multifunctional remote control transmitter for the method for self-testing and mutual testing of the present invention. Referring to FIG. 2, the present invention further comprises a test pin switch SW coupled to the microprocessor 1 of the conventional multifunctional remote control transmitter shown in FIG. 1.

Figure 3A:
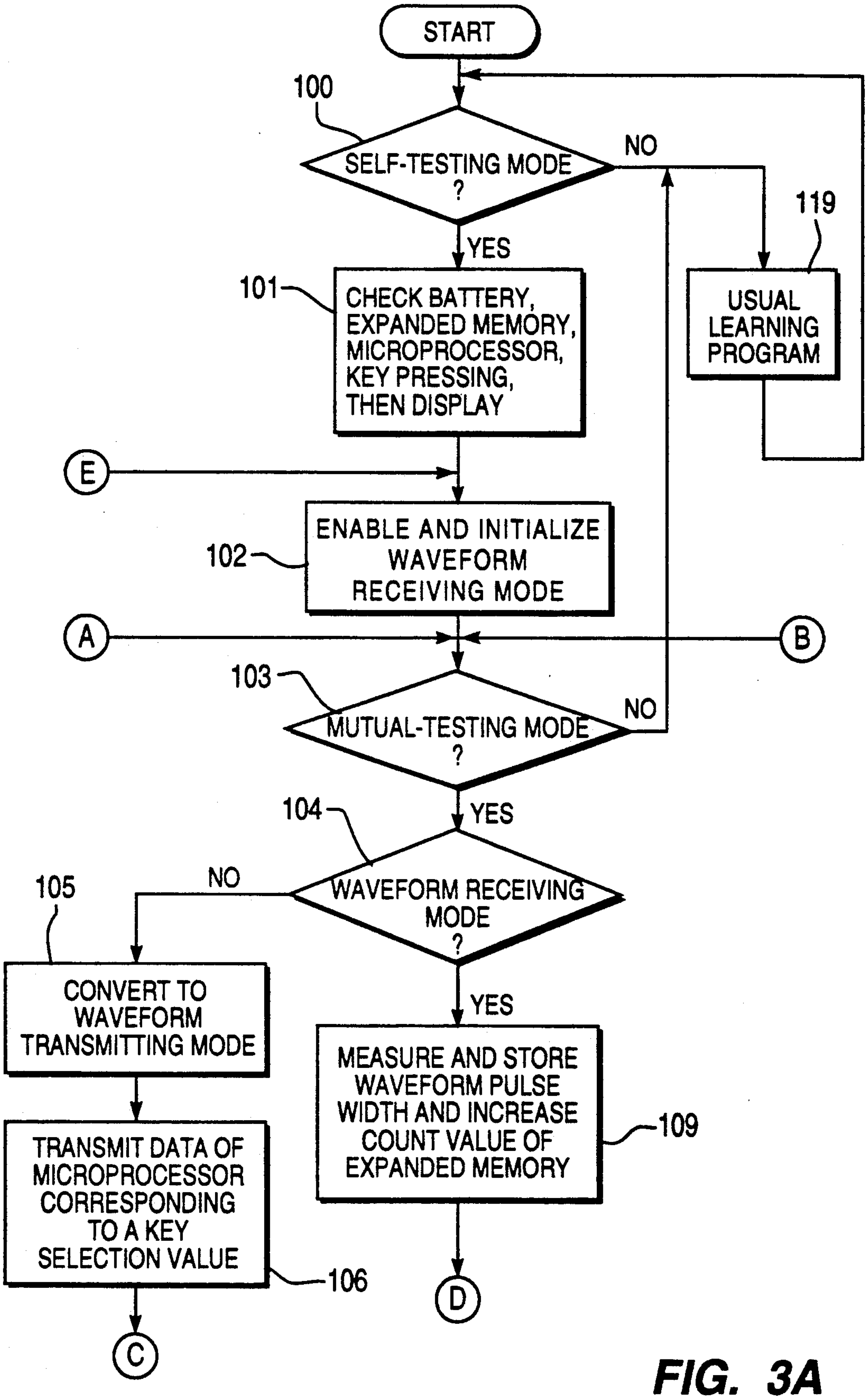
FIG. 3A and 3B are flow charts of a method for self-testing and mutual testing of the multifunctional remote control transmitters in FIG. 2.
Figure 3B:
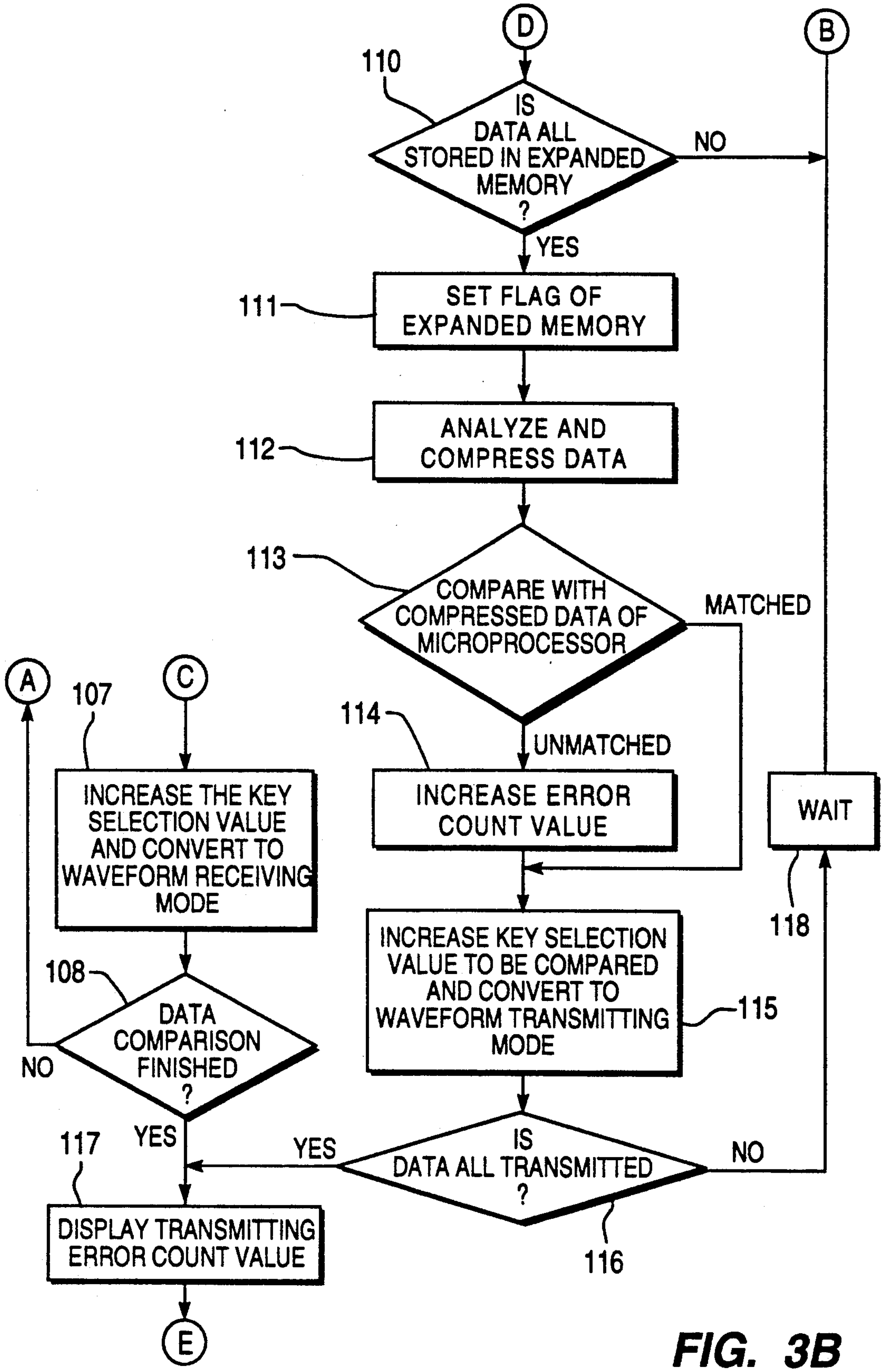
Figure 4:
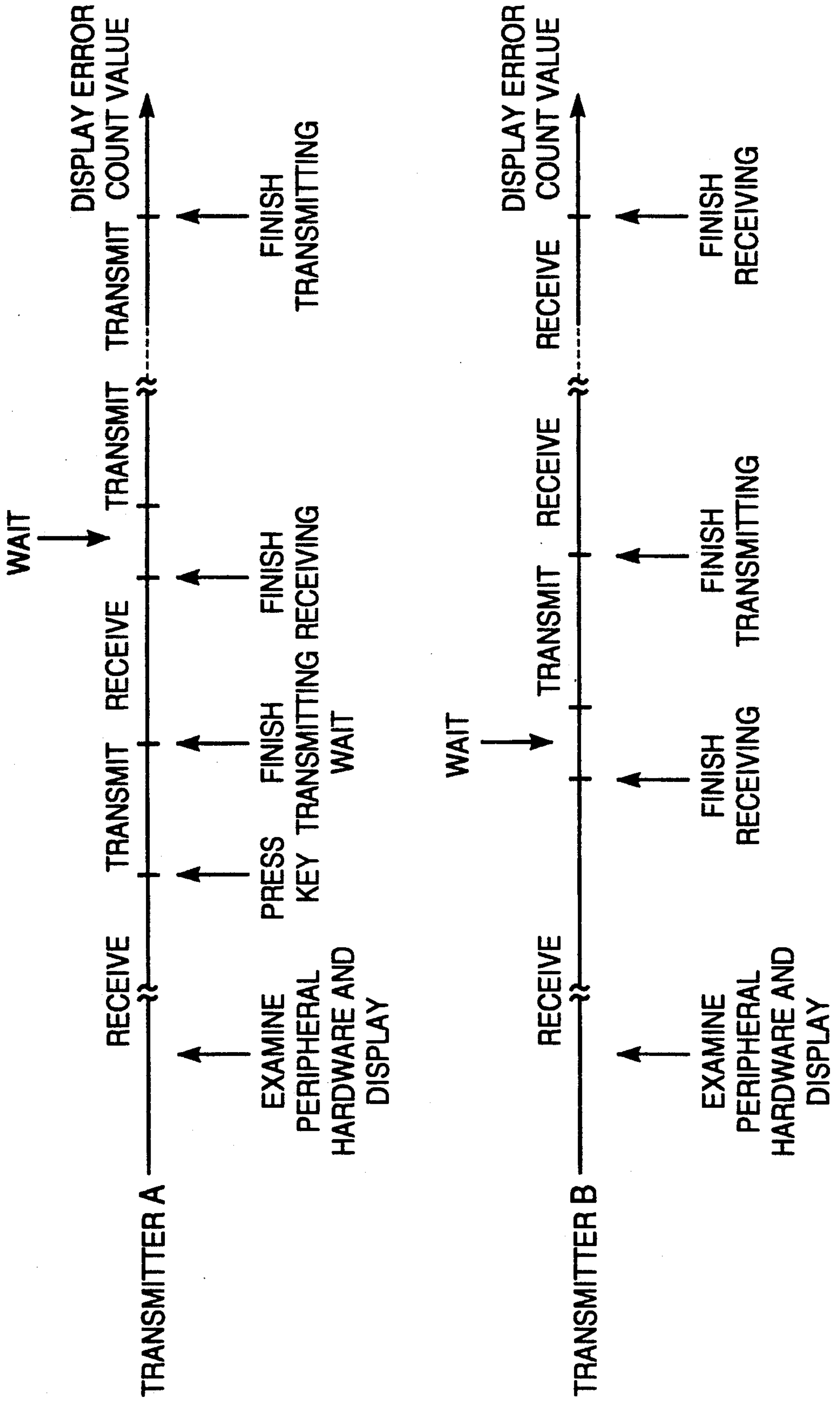
FIG. 4 illustrates a receiving and transmitting timing between the multifunctional remote control transmitters in FIG. 3A and 3B.

Referring to FIGS. 3A, 3B and 4, if test pin switch SW coupled to microprocessor 1 as shown in FIG. 2 is pressed in step 100, the self-testing mode is selected in order to self-detect the malfunction of the multifunctional remote control transmitters automatically, and if the switch is not pressed, a usual learning program is performed in step 119.

After the self-testing mode is selected in step 100, the condition of the input port of the microprocessor 1, expanded memory 5, key selector 6 and battery check unit 8 shown in FIG. 2 is examined and displayed on display 7 in step 101. The steps 100 and 101 examine the multifunctional remote control transmitter itself and display the condition of each component on the display 7.

In step 102, a waveform receiving mode is enabled and initialized and in step 103, it is determined whether or not a mutual testing mode is selected, depending on whether or not the test pin switch SW is pressed.

In step 103, if the mutual testing mode is not selected, a usual learning program is performed, and if the mutual testing mode is selected, step 103 moves to step 104 which determines whether or not the current mode is a waveform receiving mode.

If the current mode is not a waveform receiving mode in step 104, the current mode is converted to a waveform transmitting mode in step 105 and compressed data of microprocessor 1 corresponding to a key selection value is transmitted to infrared transmitter 4 to transmit the data to any other remote control transmitter in step 106.

Next, in step 107, the key selection value is increased by "1" to output the compressed data of microprocessor 1 corresponding to the next selection value and the current mode is converted to a waveform receiving mode. In step 108, if the current mode is converted to a waveform receiving mode in step 107, whether or not comparison of data inputted to the multifunctional remote control transmitter is completed is checked. Then, if the comparison is not finished, step 108 returns to step 103 and if the comparison is finished, a receiving error count value is displayed on display 7, in step 117.

Meanwhile, if the current mode is a waveform receiving mode in step 104, width of received pulse is measured, the pulse is stored, and the count value of the expanded memory 5 is increased in step 109. In step 110, whether or not data is all stored in the expanded memory 5 is checked.

If data is not all stored in the expanded memory 5 in step 110, it returns to step 103, and if the data is all stored, the flag of the expanded memory 5 is set in step 111.

In step 112, data stored in the expanded memory 5 is analyzed and compressed, and in step 113, the compressed data stored in the expanded memory 5 is compared with the compressed data stored in the microprocessor 1.

If the compressed data compared in step 113 do not match, an error count value is increased by "1" in step 114, and if the compared compressed data match, to compare it with the subsequent compressed data of expanded memory 5, a key selection value of the microprocessor 1 to be compared is increased and the current mode is converted to a waveform transmitting mode in step 115.

If the mode of any other remote control transmitter is converted to the waveform transmitting mode after step 115, whether or not data of relevant keys have all been transmitted via infrared transmitter 4 is checked in step 116.

If the data is not all transmitted in step 116, it returns to step 103 after waiting for a period in step 118, if the data is all transmitted, transmitting error count value is displayed on display 7 in step 117.

Referring to FIG. 4, multifunctional remote control transmitter A and B examine each peripheral hardware and display the examined result, respectively.

Upon displaying of the examined result, a key is selected and pressed in multifunctional remote control transmitter A to convert from a receiving mode to a transmitting mode. At this time, multifunctional remote control transmitter B, maintaining the receiving mode, finishes receiving the signals transmitted from transmitter A during its transmitting mode, then waits for a certain period of time. When the transmitter A finishes transmitting to be converted to a receiving mode, the transmitter B is converted to a transmitting mode after a delay of a certain time. Then, transmitter A finishes receiving the signals while the transmitter B is in the transmitting mode, and waits for a while.

Then, when transmitter B finishes transmitting and is to be converted to the receiving mode, the transmitter A waits for a while and is converted to the transmitting mode.

After repetition of the above process, the transmitters A and B maintain their transmitting and receiving modes, respectively. Then, if the transmitter B finishes receiving data, the transmitter A finishes transmitting data sequentially. After that, the transmitters A and B display each error count value.

As described above, the present invention facilitates checking of fault occurring in multifunctional remote control transmitter, thereby reducing poor products and enhancing the reliability of the products.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A self-testing and mutual testing method of multifunctional remote control transmitters comprising the steps of:

determining whether or not a current mode is a self-testing mode, then, if the current mode is not the self-testing mode, performing a general mode of a first multifunctional remote control transmitter, and if the current mode is the self-testing mode, examining a condition of components of the first multifunctional remote control transmitter and displaying indications of the respective conditions of the components;

determining whether or not the current mode is a mutual testing mode, and if the current mode is the mutual testing mode, determining selection of a waveform transmitting state of said first multifunctional remote control transmitter;

converting to a waveform receiving state if the waveform transmitting state is not selected;

transmitting compressed data stored in a microprocessor of said first multifunctional remote control transmitter in accordance with a key selection value, increasing the key selection value by a certain value in order to output compressed data corresponding to a next key selection value in response to selection of said waveform transmitting state;

converting said first multifunctional remote control transmitter to a waveform receiving state;

receiving and storing transmitted data received from a second multifunctional remote control transmitter in an expanded memory of said first multifunctional remote control transmitter if said waveform receiving state of said first multifunctional remote transmitter, then if the transmitted data is all stored, analyzing and compressing the transmitted data;

comparing the compressed said transmitted data to compressed data stored in the microprocessor of said first multifunctional remote transmitter, then, if the compressed transmitted data does not match the compressed data stored in the microprocessor, increasing an error count value; and determining whether all said transmitted data has been transmitted, and displaying said error count value, if all the transmitted data has been transmitted.

2. A self-testing and mutual testing method of multifunctional remote control transmitters as claimed in claim 1, wherein said the current mode is selected to be the self-testing mode by pressing a test pin switch, and the conditions of the input port of the microprocessor, said expanded memory, a key selector, and battery check unit of said first multifunctional remote control transmitter are examined.

3. A self-testing and mutual testing method of multifunctional remote control transmitters as claimed in claim 1, wherein the current mode is the mutual testing mode after conversion to the waveform receiving state.

4. A self-testing and mutual testing method of multifunctional remote control transmitters as claimed in claim 1, further comprising comparing data of an expanded memory of a microprocessor of said second multifunctional remote control transmitter to received said compressed data and displaying a receiving error count value indicative of the comparison of the data of the expanded memory and the received compressed data; and converting said second multifunctional remote control transmittcr to the waveform transmitting state.

5. A self-testing and mutual testing mode of multifunctional remote control transmitters as claimed in claim 4, wherein said second multifunctional remote control transmitter measures a width of waveform pulse of the received compressed data.

6. A self-testing and mutual testing method of a multifunctional remote controller, said method comprising the steps of:

determining whether a current mode of said multifunctional remote controller is a self-testing mode;

if the current mode is not a self-testing mode, performing a general mode of said multifunctional remote controller;

if the current mode is the self-testing mode, determining a condition of components of said multifunctional remote controller, displaying the condition, and enabling a waveform receiving state of said multifunctional remote controller;

determining whether the current mode is a mutual testing mode;

if the current mode is not the mutual testing mode, performing the general mode of said multifunctional remote controller;

if the current mode is the mutual testing mode, determining whether the current state of said multifunctional remote controller is the waveform receiving state;

converting the current state to a waveform transmitting state if the current state is determined not to be the waveform receiving state, transmitting stored data stored in said multifunctional remote controller in accordance with a key selection value, increasing the key selection value in order to transmit more said stored data in response to a subsequent key selection value, and simultaneously converting the current state to the waveform receiving state; and comparing received data to data stored in a microprocessing portion of said multifunctional remote controller if the current mode was converted to the waveform receiving state, increasing an error count value if said received data does not match the data stored in the microprocessing portion, then, displaying said error count value if the comparison is completed.

7. The self-testing and mutual testing method of multifunctional remote controller of claim 6, wherein the self-testing mode is enabled by pressing a test pin switch.

8. The self-testing and mutual testing method of multifunctional remote controller of claim 6, wherein the step for determining whether the current mode is the mutual testing mode is performed after the waveform receiving state of the multifunctional remote controller is enabled.

9. The self-testing and mutual testing method of multifunctional remote controllers of claim 6, wherein the step for determining whether the current mode is the self-testing mode further comprises checking conditions of an input port, the expanded memory, a key selector and displaying the conditions on a display device.

10. A testing process of a multifunctional remote controller, said process comprising:

checking for user selection of testing mode;

in response to selection of said testing mode, enabling a transmission receiving state of said controller enabling a transmitting state of said controller;

making determinations of whether established criteria were met by comparing modulated radiation received during said transmission receiving state to said established criteria stored in said controller;

providing an indication of an error count in dependence upon said determination; and in response selection of said testing mode, automatically generating transmitted modulated radiation indicative of selectable functions of said controller, said transmitted modulated radiation for being received by a receiving device for comparison to established criteria.

11. A testing process as claimed in claim 10, further comprising performing a self test of components of said controller and displaying a condition of said components determined in said self test.

12. A mutual testing process for a first remote controller in conjunction with a second remote controller, said process comprising:

enabling selection of a mutual testing mode of said first remote controller;

said first remote controller successively generating modulated radiation indicative of selectable functions of said first remote controller, said modulated radiation to be received by said second remote controller; and said second remote controller comparing received said modulated radiation to established criteria stored in said second remote controller by determining widths of waveform pulses of said received modulated radiation and comparing the determined widths to said established criteria for said widths and providing a first error count representing a number times said established criteria were not met.

13. A mutual testing process as claimed in claim 12, further comprising:

said second remote controller successively generating modulated radiation indicative of selectable functions of said second remote controller, said modulated radiation to be received by said first remote controller; and said first remote controller comparing received said modulated radiation to established criteria stored in said first remote controller and providing a second error count representing a number times said established criteria were not met.

14. A testing process as claimed in claim 12, further comprising performing a self-test by said first remote controller and displaying a condition of components of said first remote controller determined in said self test.

15. A mutual testing process for a first remote controller and a second remote controller, said process comprising:

enabling user selection of a mutual testing mode of said first remote controller and said second remote controller;

in response to selection of said mutual testing mode, enabling user selection of a transmitting state of said first remote controller;

in response to selection of said transmitting state of said first remote controller, said first remote controller successively generating first modulated radiation indicative of selectable functions of said first remote controller, said first modulated radiation to be received by said second remote controller;

said second remote controller comparing received said first modulated radiation to established criteria stored in said second remote controller and providing first indications when said established criteria were not met by said received first modulated radiation;

in response to said first remote controller finishing generating said first modulated radiation, said second remote controller automatically converting to said transmitting state;

in response to said second remote controller automatically converting to said transmitting state, said second remote controller successively generating second modulated radiation indicative of selectable functions of said second remote controller, said second modulated radiation to be received by said first remote controller; and said first remote controller comparing received said second modulated radiation to established criteria stored in said first remote controller and providing second indications when said established criteria were not met by said received second modulated radiation.

16. A mutual testing process as claimed in claim 15, further comprising said first remote controller performing a self-test and displaying a condition of components of said first remote controller determined in said self test.

17. A mutual testing process as claimed in claim 15, wherein comparing said received first modulated radiation to established criteria comprises, said second remote controller determining widths of waveform pulses of said received first modulated radiation and comparing the determined widths to said established criteria for said widths.

18. A mutual testing process of a multifunctional remote controller, said process comprising:

checking for user selection of testing mode;

in response to selection of said testing mode, enabling a transmission receiving state of said controller enabling a transmitting state of said controller;

making determinations of whether established criteria were met by comparing modulated radiation received during said transmission receiving state to said established criteria stored in said controller including determining widths of waveform pulses of said received modulated radiation and comparing the determined widths to said established criteria for said widths; and providing an indication of an error count in dependence upon said determination.

19. A self-testing and mutual testing method of multifunctional remote control transmitters comprising the steps of:

determining whether or not a current mode is a self-testing mode, then, if the current mode is not the self-testing mode, performing a general mode of a multifunctional remote control transmitter, and if the current mode is the self-testing mode, examining a condition of components of the multifunctional remote control transmitter and displaying indications of the respective conditions of the components;

determining whether or not the current mode is a mutual testing mode, and if the current mode is the mutual testing mode, determining selection of a waveform transmitting state;

converting to a waveform receiving state if the waveform transmitting state is not selected;

outputting compressed data stored in a microprocessor of said multifunctional remote control transmitter in accordance with a key selection value, increasing the key selection value by a certain value in order to output compressed data corresponding to a next key selection value in response to selection waveform transmitting state; and converting said multifunctional remote control transmitter to a waveform receiving state.

* * * * *